United States Patent
Narula et al.

(10) Patent No.: US 10,520,603 B2
(45) Date of Patent: Dec. 31, 2019

(54) TUNNEL DETECTION SYSTEM AND METHOD FOR A MOTOR VEHICLE

(71) Applicant: Aptiv Technologies Limited, St. Michael (BB)

(72) Inventors: Prashant J. Narula, Wuppertal (DE); Konstantin Statnikov, Dusseldorf (DE)

(73) Assignee: Aptiv Technologies Limited (BB)

( * ) Notice: Subject to any disclaimer, the term of this patent is extended or adjusted under 35 U.S.C. 154(b) by 0 days.

(21) Appl. No.: 16/265,003

(22) Filed: Feb. 1, 2019

(65) Prior Publication Data
US 2019/0250280 A1    Aug. 15, 2019

(51) Int. Cl.
| | |
|---|---|
| *B60H 1/00* | (2006.01) |
| *G01S 19/14* | (2010.01) |
| *G01S 19/39* | (2010.01) |
| *G08G 1/01* | (2006.01) |

(52) U.S. Cl.
CPC .............. *G01S 19/14* (2013.01); *G01S 19/39* (2013.01); *G08G 1/012* (2013.01); *G08G 1/0137* (2013.01); *B60Q 2300/337* (2013.01)

(58) Field of Classification Search
USPC .................................................. 340/539.13
See application file for complete search history.

(56) References Cited

U.S. PATENT DOCUMENTS

| | | | |
|---|---|---|---|
| 2006/0271295 A1 | 11/2006 | McLaren et al. | |
| 2007/0163771 A1* | 7/2007 | Straub ................ | B60H 1/00735 165/202 |
| 2015/0296041 A1 | 10/2015 | Amrhein et al. | |
| 2019/0161087 A1* | 5/2019 | Kawabe ................ | B60W 40/02 |
| 2019/0168610 A1* | 6/2019 | Nakane .................... | H04N 5/66 |

FOREIGN PATENT DOCUMENTS

DE    10 2015 016045 A1    6/2017

* cited by examiner

*Primary Examiner* — Brent Swarthout
(74) *Attorney, Agent, or Firm* — Joseph V. Bonadies

(57) ABSTRACT

A tunnel detection system for a motor vehicle comprises a radiofrequency signal receiver provided to receive a radiofrequency signal coming from a source external to the vehicle; a controller communicating with the radiofrequency signal receiver, the controller being configured to detect at least one amplitude variation in the radiofrequency signal received by the receiver; the controller is configured to determine at least one correspondence level representative of the difference between the detected amplitude variation in the radiofrequency signal and at least one predetermined reference signal amplitude variation representative of the amplitude variation in a signal received by the receiver when the receiver travels into a tunnel; the controller is configured to compare the determined correspondence level with a predetermined minimum correspondence threshold, and detect the tunnel being travelled through by the detection system when the determined correspondence level is greater than or equal to the predetermined minimum correspondence threshold.

6 Claims, 5 Drawing Sheets

TUNNEL DETECTION SYSTEM AND METHOD FOR A MOTOR VEHICLE

TECHNICAL FIELD OF INVENTION

The present invention relates to a tunnel detection system for a motor vehicle and to the method for detecting the tunnel by way of the system.

BACKGROUND OF INVENTION

Tunnel detection by way of a detection system comprising cameras in a vehicle is known. This detection is generally based on signpost recognition. Tunnel detection makes it possible to adjust driving assistance devices when the vehicle travels into the tunnel. If the cameras for detecting the tunnel fail, it becomes no longer possible to adjust the driving assistance devices when the vehicle travels into the tunnel. For economic reasons, some vehicles are not equipped with road-monitoring cameras.

One known alternative for tunnel detection is tunnel detection using a radar signal. However, this alternative is not very robust and may feedback incorrect information to the driving assistance devices. The most critical example relates to an incorrect detection of an obstacle on the path of the vehicle instead of a tunnel detection. Specifically, in this erroneous situation, if the vehicle is equipped with an automatic emergency braking function, this function may be incorrectly triggered since the vehicle is simply in a tunnel whose structure causes reflections of radar waves to be falsely interpreted as being the presence of an obstacle on the path of the vehicle.

SUMMARY OF THE INVENTION

Described herein is a system able to detect a vehicle travelling into a tunnel using only standard sensors on board the vehicle, without having the need for additional sensors such as a camera or a radar. In addition, if a camera is available but not operational due to a fault with the sensor, the inventive substitution of the tunnel detection device for the camera makes it possible to detect whether the vehicle is entering or exiting a tunnel, so as to be able to perform the necessary adjustments in the vehicle.

According to a first embodiment, a tunnel detection system for a motor vehicle comprises a radiofrequency signal receiver provided so as to receive a radiofrequency signal coming from a source external to the vehicle, a controller communicating with the radiofrequency signal receiver, the controller being configured so as to detect at least one amplitude variation in the radiofrequency signal received by the receiver. The controller is configured so as to determine at least one correspondence level representative of the difference between the detected amplitude variation in the radiofrequency signal and at least one predetermined reference signal amplitude variation representative of the amplitude variation in a signal received by the receiver when the receiver travels into a tunnel. The controller is also configured so as to compare the determined correspondence level with a predetermined minimum correspondence threshold, and the controller is configured so as to detect the system travelling into a tunnel when the determined correspondence level is greater than or equal to the predetermined minimum correspondence threshold.

The radiofrequency signal receiver may comprise a satellite geolocation system.

The predetermined reference signal amplitude variation may comprise a predetermined exponential decreasing or predetermined exponential increasing amplitude variation, representative of the receiver travelling into a tunnel entrance or into a tunnel exit, respectively, so as to be able to detect the tunnel being travelled through by the detection system.

The tunnel detection system may comprise at least one sensor for sensing at least one weather condition, preferably a brightness sensor, the controller being able to be configured so as to detect at least one weather condition variation and also being able to be configured so as to adjust the predetermined minimum correspondence threshold according to the detected weather condition variation.

According to the invention, a motor vehicle comprises the tunnel detection system of the first embodiment. The motor vehicle may comprise an automatic emergency braking device using radar detection and electrically connected to the tunnel detection system, such that the tunnel detection system is or is not able to authorize emergency automatic braking.

According to the invention, a method for detecting a tunnel by way of a motor vehicle comprising the detection system of the first embodiment comprises the steps of: receiving a radiofrequency signal coming from a source external to the vehicle; detecting an amplitude variation in the received radiofrequency signal; determining at least one correspondence level representative of the difference between the detected amplitude variation in the radiofrequency signal and at least one predetermined reference signal amplitude variation representative of the received signal amplitude variation when the vehicle travels into a tunnel; comparing the determined correspondence level with a predetermined minimum correspondence threshold; and detecting that the vehicle is travelling through a tunnel when the determined correspondence level is greater than or equal to the predetermined minimum correspondence threshold.

The step of determining at least one correspondence level may comprise a step of determining at least one correspondence level representative of the difference between the detected amplitude variation in the radiofrequency signal and a predetermined exponential decreasing or predetermined exponential increasing amplitude variation representative of the receiver travelling into a tunnel entrance or into a tunnel exit, respectively.

The step of comparing the determined correspondence level with a predetermined minimum correspondence threshold may comprise, beforehand, the steps of: detecting a variation in weather conditions; and adjusting the predetermined minimum correspondence threshold according to the detected weather condition variation.

According to the invention, a method for activating an automatic emergency braking function of a vehicle comprising the detection method described above comprises a step of authorizing the automatic emergency braking function upon detection of the tunnel being travelled through by the detection system.

Further features and advantages will appear more clearly on a reading of the following detailed description of the preferred embodiment, which is given by way of non-limiting example only and with reference to the accompanying drawings.

BRIEF DESCRIPTION OF DRAWINGS

Other features, aims and advantages of the invention will emerge upon reading the following detailed description, and with reference to the appended drawings, given by way of nonlimiting example and in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
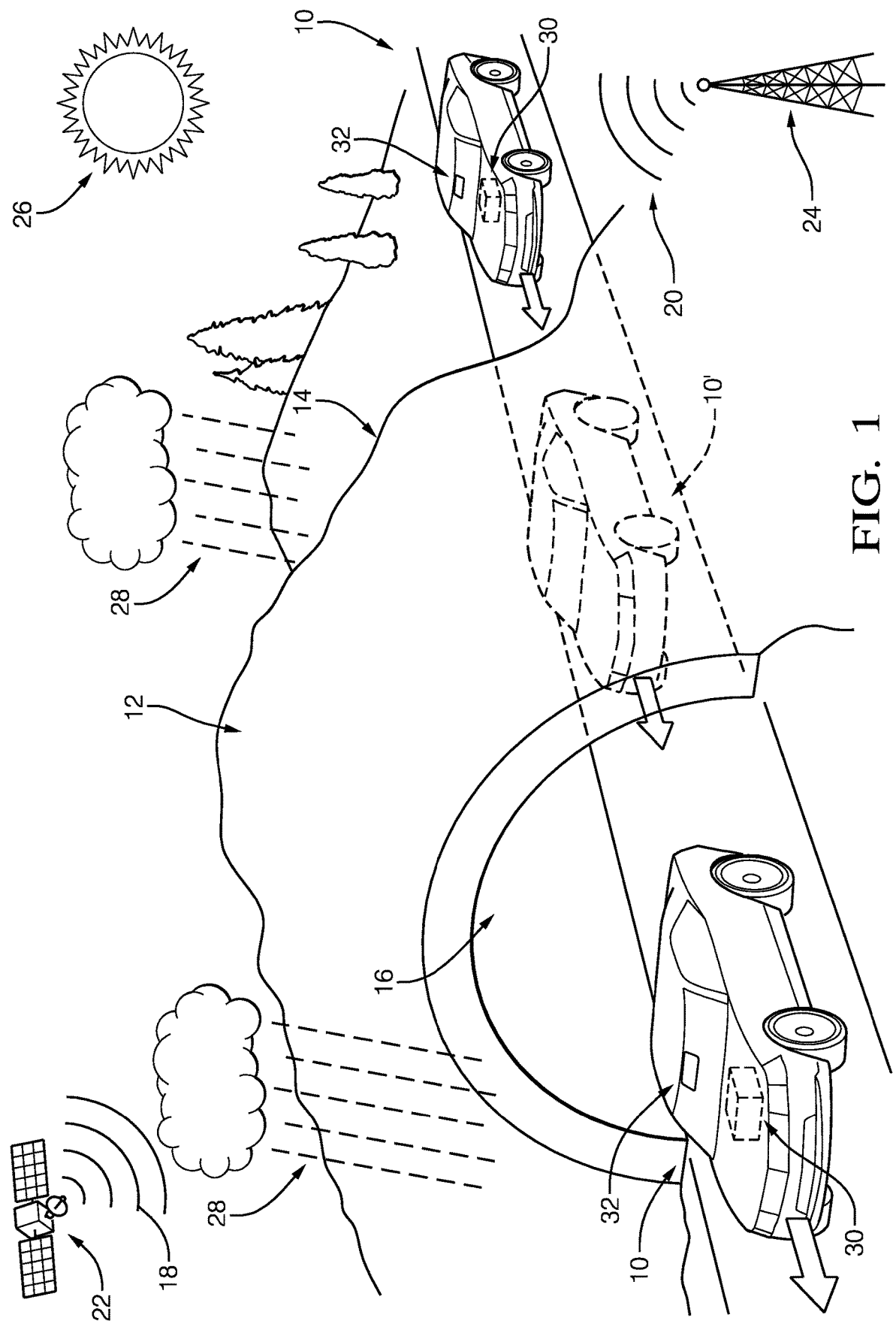
FIG. 1 is a schematic depiction of a vehicle travelling through a tunnel and subjected to phenomena conditions external to the vehicle.

FIG. 1 shows a motor vehicle 10 travelling through a tunnel 12. The tunnel 12 is travelled through in three phases. The vehicle 10 is shown in the three phases of travelling through the tunnel. The vehicle is shown first of all in the first phase, said first phase consisting in the vehicle 10 travelling into the entrance 14 of the tunnel 12. The vehicle 10 is shown second of all (in dashed lines), seen transparently through the tunnel 12, in the second phase, said second phase consisting in the vehicle 10 driving inside the tunnel 12. The vehicle 10 is shown third of all in the third phase, said third phase consisting in the vehicle 10 travelling into the exit 16 of the tunnel 12.

In FIG. 1, when the vehicle 10 is situated in open air, therefore not in the tunnel 12, the vehicle 10 is subjected to several phenomena external to the vehicle 10.

The vehicle 10 is subjected to various radiofrequency waves 18, 20 coming from sources external to the vehicle 10. For example and without limitation, the radiofrequency waves 18, 20 may come from a geolocation satellite 22 provided for the operation of satellite geolocation devices (GPS), from radio stations provided for the operation of car radios, or else from telephony relay antennas 24 provided for the operation of mobile telephony devices.

The vehicle 10 is also subjected to various weather conditions. For example and without limitation, the weather conditions may be sunshine 26 that causes significant brightness in the surroundings of the vehicle 10, rain showers 28, a wind phenomenon, snow showers, high or low temperatures, etc.

Generally speaking, the phenomena external to the vehicle 10 are changed or even disappear in the "in a tunnel" environment. In other words, the perception of the phenomena external to the vehicle 10 differs when the vehicle 10 changes from an "open-air" environment to an "in a tunnel" environment, and vice versa.

According to a first embodiment of the invention, the vehicle comprises at least one device detecting the phenomena external to the vehicle.

The vehicle comprises at least one receiver 30 for receiving radiofrequency signals coming from sources external to the vehicle 10. For example and without limitation, the radiofrequency signal receiver 30 may be a satellite geolocation device (GPS), a car radio or else a telephony signal reception device.

Additionally, the vehicle 10 also comprises at least one weather condition sensor 32, that is to say at least one sensor 32 able to detect a phenomenon caused by the weather such as sunshine 26, rain showers 28, wind, snow, the temperature, etc. For example and without limitation, the vehicle may comprise a brightness sensor 32 generally interacting with the lighting outside and inside the vehicle, or else a rain sensor 32 interacting with the windscreen wiper devices.

The radiofrequency wave sensors 32 and receivers 30 mentioned above are overall standard sensors/receivers integrated into the vehicle (such as a GPS receiver, a brightness sensor, etc.) supplying samples of the strength/of the power of the signal measured by the sensor in time/space.

Figure 2:
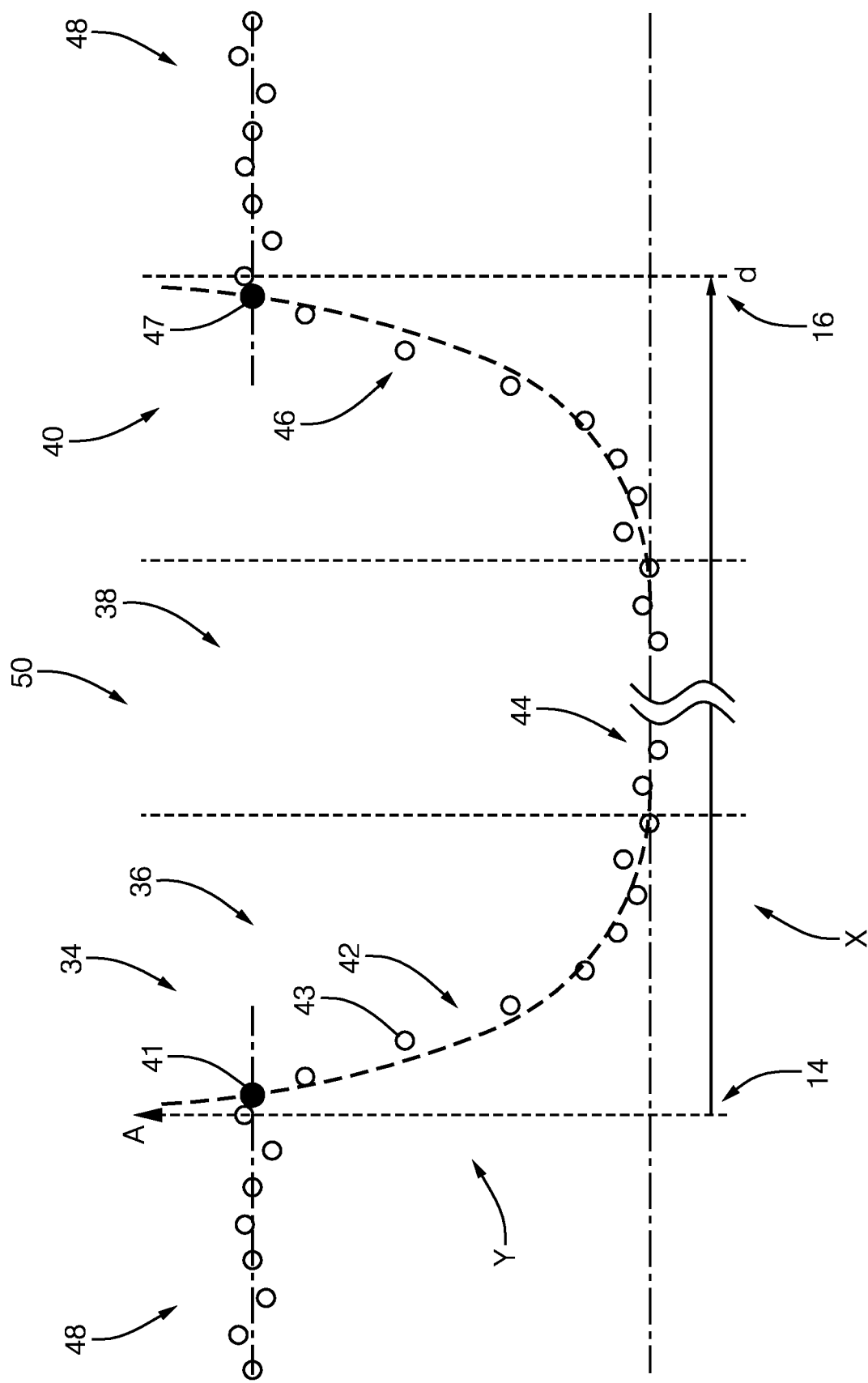
FIG. 2 is a graph illustrating an example of a detected amplitude variation in a radiofrequency signal received by the radiofrequency signal receiver of the vehicle.

FIG. 2 shows a graph 34 illustrating an example of a detected amplitude variation in a radiofrequency signal received by the radiofrequency signal receiver 30 of the vehicle 10. More particularly, the circles 43 represent measurement samples of the amplitude of the GPS signal received by the GPS device of the vehicle 10 when the vehicle 10 travels into a tunnel 12. In other words, this is the amplitude variation in the GPS signal received by the GPS device of the vehicle 10 when the vehicle changes from an "open-air" environment 48 to an "in a tunnel" environment 50, and then from the "in a tunnel" environment 50 to the "open-air" environment 48.

The abscissa axis X represents a distance d extending from the entrance 14 of the tunnel 12 to the exit 16 of the tunnel 12. The ordinate axis Y represents the amplitude A variation in the GPS signal received by the GPS device of the vehicle 10 when the vehicle 10 travels into the tunnel 12. The graph 34 is divided into the three phases of the vehicle 10 travelling through the tunnel 12, that is to say the phase 36 of the vehicle 10 entering the tunnel 12, the phase 38 of the vehicle 10 travelling through the tunnel 12 and the phase 40 of the vehicle 10 exiting the tunnel 12.

In the phase 36 of the vehicle 10 entering the tunnel 12, when the vehicle 10 changes from the "open-air" environment 48 to the "in a tunnel" environment 50, there is a decrease in the received GPS signal. Specifically, generally speaking, the radiofrequency signals coming from outside the tunnel 12 virtually do not propagate into the tunnel 12. It should be noted that this decrease is not reflected in an immediate loss of the GPS signal as soon as the vehicle 10 is in the tunnel 12. However, generally speaking, the decrease in the received GPS signal is perceptible to the GPS device of the vehicle 10 after the vehicle 10 has travelled a few metres into the tunnel 12. In general, the amplitude A of the received GPS signal decreases from the amplitude of the GPS signal received just before the vehicle 10 travels into the entrance 14 of the tunnel 12 to an amplitude A level that is very low overall, or even zero, and generally too low to be utilized by the geolocation device of the vehicle 10. In particular, this signal decrease may follow a decreasing exponential law 42 modelled by the dashed curve on the graph 50.

Generally speaking, in the phase 38 of the vehicle 10 travelling through the tunnel 12, when the vehicle 10 is travelling through the tunnel 12, the amplitude of the received GPS signal constantly remains very low overall, or even zero. In other words, the received signal is overall a flat signal 44 modelled by the dashed curve.

In the phase 40 of the vehicle 10 exiting the tunnel 12, when the vehicle 10 changes from the "in a tunnel" environment 50 to the "open-air" environment 48, there is an increase in the amplitude A of the received GPS signal. This increase in the amplitude A of the received signal is reflected in a gradual increase in the amplitude of the GPS signal as soon as the vehicle 10 approaches the exit 16 of the tunnel 12. In general, the increase in the amplitude A of the received GPS signal starts to be perceptible to the GPS device of the vehicle 10 a few metres before the exit 16 of the tunnel 12. In general, the increase in the amplitude A of the received GPS signal increases from the very low, or even zero, amplitude A level to an amplitude A level of the same order of magnitude as the one received just before the vehicle 10 entered the tunnel 12. In particular, this increase in the amplitude A of the signal may follow an increasing exponential law 46 modelled by the dashed curve on the graph 50.

Figure 3:
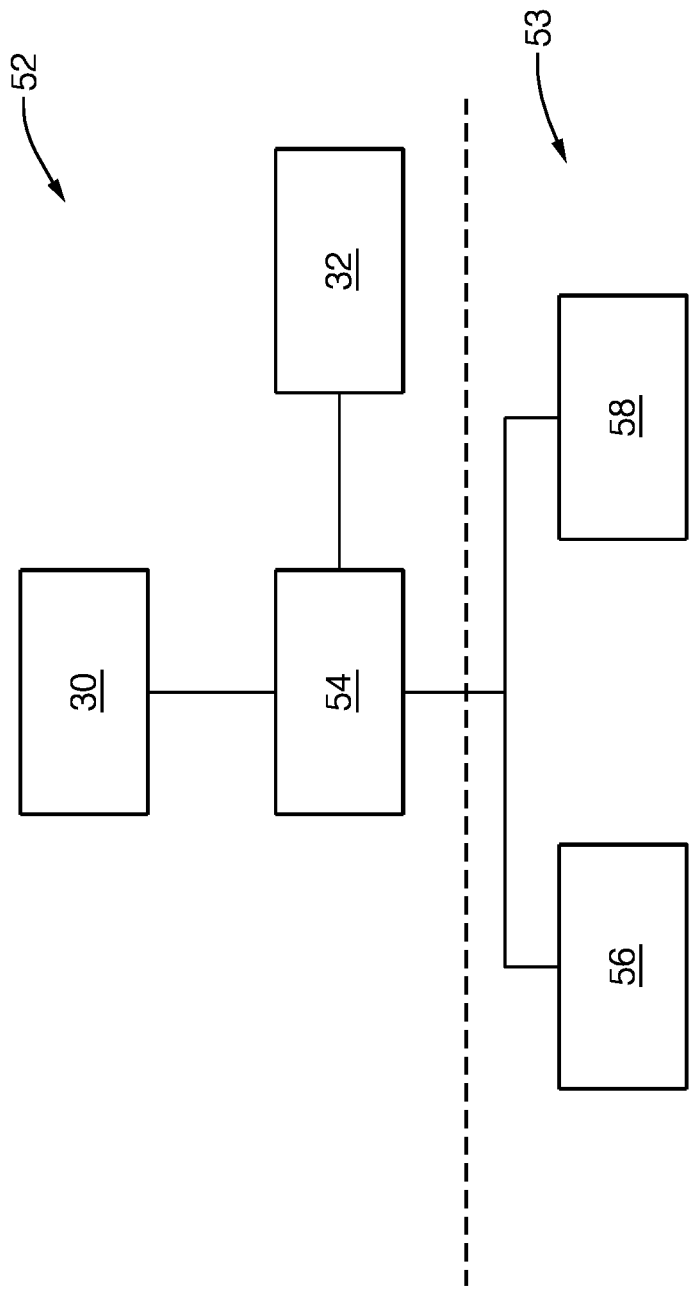
FIG. 3 is a schematic depiction of the block diagram of the tunnel detection system associated with driving assistance functions of the vehicle, according to a first embodiment.

In FIG. 3, the vehicle 10 comprises a tunnel 12 detection system 52 including the radiofrequency signal receiver 30 provided so as to receive a radiofrequency signal coming from a source external to the vehicle 10 and a controller 54 communicating with the radiofrequency signal receiver 30. Additionally, the detection system 52 also comprises other standard vehicle sensors, of weather condition sensor 32 type such as described above, electrically connected to the controller 54.

The controller 54 of the tunnel 12 detection system 52 is configured so as to be able to detect variations in the signals received from the weather condition sensors 32 and from the radiofrequency signal receiver 30, so as to detect the presence of the tunnel 12 when the vehicle 10 travels through the tunnel 12.

In particular, the tunnel 12 detection system 52 interacts with driving assistance devices 53 of the vehicle 10 such as, for example and without limitation, an automatic emergency braking device 56 using radar detection or else an adaptive speed regulation device 58. According to this embodiment, the controller 54 is therefore electrically connected to the driving assistance functions 55 of the vehicle 10, so as to be able to adjust said driving assistance functions 55 to the "in a tunnel" environment 50.

By way of example and without limitation, the detection of a tunnel 12 by way of the detection system 52 of the invention makes it possible to maintain or to authorize the automatic emergency braking function 57 of the automatic emergency braking device 56. Specifically, by virtue of the tunnel 12 detection system 52 of the invention, certain radar wave reflections emitted beforehand by the vehicle 10 may be interpreted by the automatic emergency braking device as being the presence of the tunnel 12 and not an obstacle on the path of the vehicle 10. Untimely automatic emergency braking is thus able to be avoided.

According to one preferred embodiment, in order to be able to detect a tunnel 12 being travelled through by the system 52, the controller 54 communicates with the radiofrequency signal receiver 30, the controller 54 being configured so as to detect the amplitude variations in the radiofrequency signal received by the receiver 30. The controller 54 is configured so as to determine at least one correspondence level FL representative of the difference between the detected amplitude variation in the received radiofrequency signal and at least one predetermined reference signal RS amplitude variation representative of the amplitude variation in a signal received by the receiver 30 when the receiver 30 travels into a tunnel 12.

The correspondence level FL between the detected amplitude variation in the signal and a predetermined reference signal RS amplitude variation may vary between 0% and 100%. A correspondence level FL of 0% is determined when the two signals under comparison do not have any similarity. A correspondence level FL of 100% is determined when the amplitude variation in the two signals under comparison is strictly identical. A correspondence level FL of between 0% and 100% corresponds to the degree of similarity between the law of variation in the detected amplitude of the signal and the law of variation in the predetermined amplitude of the reference signal RS.

The controller 54 is configured so as to compare the determined correspondence level FL with a predetermined minimum correspondence threshold TH. The predetermined minimum correspondence threshold TH is the minimum degree of similarity required by the detection system 52 for drawing a conclusion with regard to the detection or lack of detection of a tunnel 12 being travelled through by the detection system 52. The controller 54 is preferably configured so as to detect at least one weather condition variation and so as to adjust the predetermined minimum correspondence threshold TH according to the variation in the detected weather conditions. If the controller 54 detects a relatively surprising variation in weather conditions, the controller 54 will conclude that there is an increased probability of detection of a tunnel 12 being travelled through by the system 52, the detection system 52 having already detected an amplitude variation in the received radiofrequency signal. A surprising variation in weather conditions is an unusual variation in a weather phenomenon in the "open-air" environment 48. As such, the predetermined minimum correspondence threshold TH may be revised downwards. Specifically, the combination of the determined correspondence level FL and the detection of a relatively surprising variation in weather conditions increases the degree of probability that the system 52 is travelling into the tunnel 12.

By way of nonlimiting example, a surprising variation in weather conditions may be a sudden stoppage of a rain shower 28, a sudden rain shower 28, an abrupt change in brightness, changing from light to dark or changing from dark to light. These surprising variations in weather conditions suggest that the detection system 52 is travelling through a tunnel 12. Specifically, when a vehicle 10 travels through a rain shower 28 in the "open-air" environment 48, when the vehicle enters a tunnel 12, the vehicle 10 is suddenly no longer subjected to the rain shower 28. By contrast, if the weather conditions in the "open-air" environment 48 are rain showers 28, a vehicle 10 exiting a tunnel 12 in which there are not normally rain showers 28 is suddenly subjected to the rain showers 28.

By way of example and without limitation, a predetermined reference signal RS amplitude variation may be a signal comprising an amplitude variation that follows an exponential decreasing law 42 or exponential increasing law 46 representative of the receiver 30 travelling into a tunnel 12 entrance 14 or into a tunnel 12 exit 16, respectively. In this example, if the detected amplitude variation in the radiofrequency signal follows the same decreasing exponential law 42 of the predetermined amplitude variation in the reference signal RS, then the correspondence level FL should be 100%. The correspondence level FL of 100% will necessarily be greater than or equal to the minimum correspondence threshold TH required such that the system detects the system 52 travelling into the entrance 14 of the tunnel 12.

By way of example and without limitation, the minimum correspondence threshold TH may be set at 90% by default, such that the detection of the tunnel 12 being travelled through by the system 52 is limited to the detection of radiofrequency signals whose amplitude varies virtually similarly to the predetermined amplitude variations in the reference signals RS. If however, during the detection of an amplitude variation in the received radiofrequency signal, the system 52 also detects a variation in rain shower 28 or in surprising brightness, such as described above, the minimum correspondence threshold is revised downwards, changing for example from 90% to 70%.

In addition to the detection of a tunnel 12 being travelled through by the detection system 52, the position of the entrance 14 of the tunnel 12 is estimated using the first point of interception 41 (see FIG. 2) between the received radiofrequency signal level in the constant "open-air" environment 48 detected before the detection system 52 enters the tunnel 12 and the decrease in amplitude of the detected signal when the detection system 52 enters the tunnel 12. The position of the exit 16 of the tunnel 12 is estimated in the same way using the second point of interception 47 (see FIG. 2) between the signal level in the constant "open-air" environment 48 detected after the detection system 52 exits the tunnel 12 and the increase in amplitude of the detected signal when the detection system 52 exits the tunnel 12.

Figure 4:
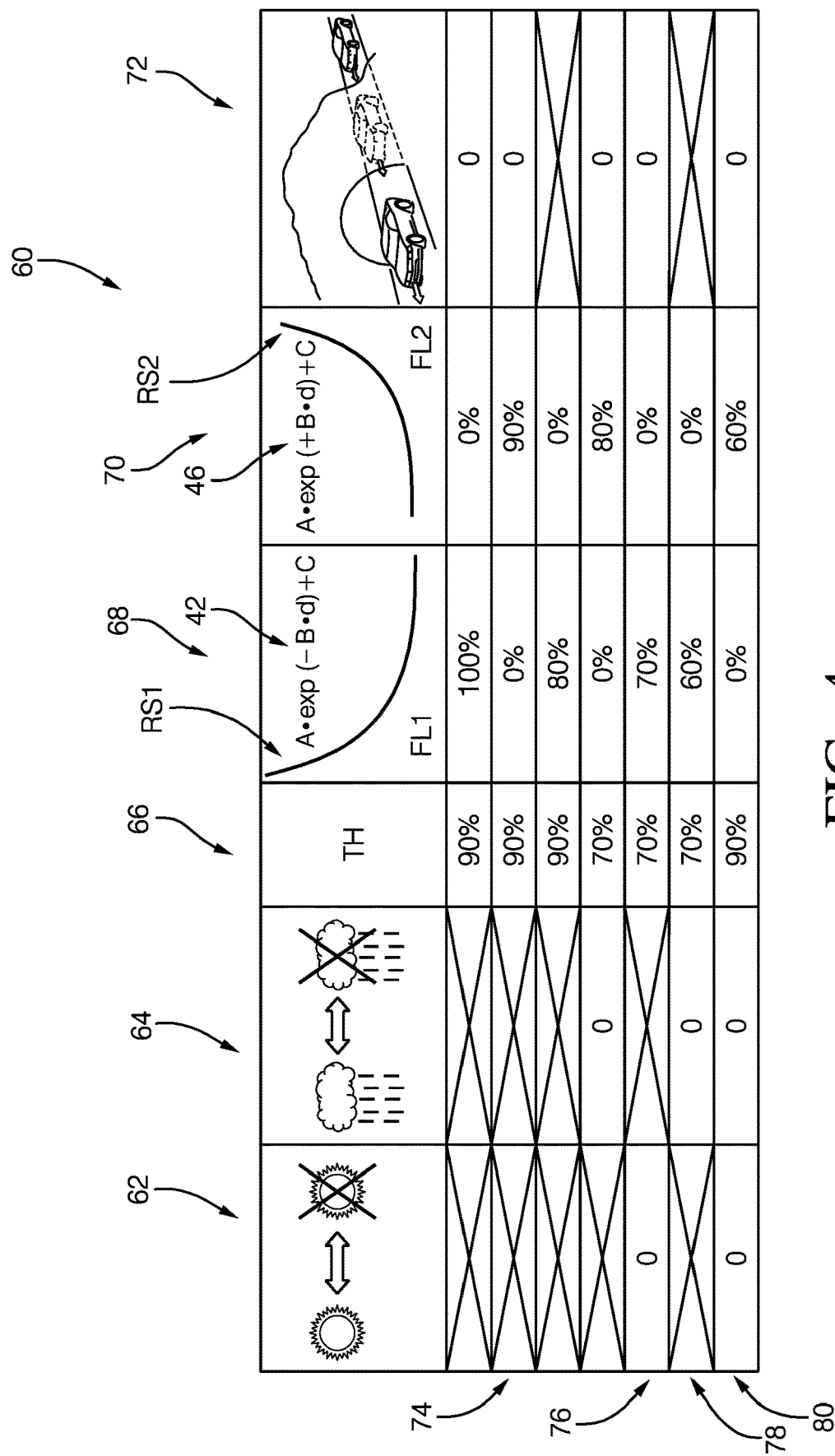
FIG. 4 is a table of exemplary scenarios for detecting a tunnel travelled through by the vehicle equipped with the detection system of FIG. 3.

FIG. 4 shows a table 60 summarizing several nonlimiting exemplary scenarios of detection or lack of detection of a tunnel 12 being travelled through by the vehicle 10 comprising the detection system 52. Each row of the table 60 corresponds to a scenario of detection or lack of detection of the vehicle 10 travelling into a tunnel 12.

As outlined in the header of the first column 62, the first column 62 shows the result of the detection, by a brightness sensor, of the abrupt variation in brightness, changing from light to dark or vice versa. When a box in the first column 62 is marked with a cross, this means that such a variation is not detected. When a box in the first column 62 is marked with a circle, this means that such a variation has been detected.

Similarly, as outlined in the header of the second column 64, the second column 64 shows the result of the detection, by a rain sensor, of the abrupt variation in rain shower 28, changing from a rain shower 28 to a situation without rain showers 28 or vice versa. When a box in the second column 64 is marked with a cross, this means that such a variation is not detected. When a box in the second column 64 is marked with a circle, this means that such a variation has been detected.

The third column 66 indicates the predetermined minimum correspondence threshold TH. When no variation in weather conditions is detected, the threshold TH is set at 90%. When a single variation in weather conditions is detected, the threshold TH is set at 70%. When two variations in weather conditions are detected, the minimum correspondence threshold TH is set at 60%.

The fourth column 68 and the fifth column 70 show correspondence levels FR between the detected amplitude variation in the radiofrequency signal and a predetermined reference signal RS amplitude variation. More precisely, the fourth column 68 and the fifth column 70 respectively show first correspondence levels FL1 between the detected amplitude variation in the radiofrequency signal and a predetermined exponential decreasing amplitude variation 42 in a first reference signal RS1, and second correspondence levels FL2 between the detected amplitude variation in the radiofrequency signal and a predetermined exponential increasing amplitude variation 46 in a second reference signal RS2. In this example, correspondence levels of 0%, 60%, 70%, 80%, 90% and 100% will be noted. It should be noted in this example that, when the first correspondence level FL1 between the detected amplitude variation in the radiofrequency signal and a decreasing exponential amplitude variation 42 is at least 60%, then the second correspondence level FL2 between the detected amplitude variation in the radiofrequency signal and an increasing exponential amplitude variation 46 is 0%. This is due simply to the fact that an amplitude variation that follows a decreasing exponential law of the type "A.exp(−Bd)+C" is considered by the system of the invention not to have any degree of similarity with an amplitude variation that follows an increasing exponential law of the type "A.exp(+Bd)+C". The variable "d" of the exponential laws is representative of the distance travelled by the vehicle. The values A, B and C are constants that depend on the nature of the tunnel and on the characteristics of the radiofrequency signals.

The sixth column 72 shows the result of the detection of a tunnel 12 being travelled through by the detection system 52 on board the vehicle 10. If a box in the sixth column 72 is marked with a cross, this means that detection has not occurred. If a box is marked with a circle, then this means that detection has occurred.

For example, in the second scenario 74 (second row), the first correspondence level FL1 between the detected amplitude variation in the radiofrequency signal and an exponential decreasing amplitude variation 42 is 0%, and the second correspondence level FL2 between the detected amplitude variation in the radiofrequency signal and an exponential increasing amplitude variation 46 is 90%. Since the predetermined minimum correspondence threshold TH has been set at 90%, the detection system 52 then draws a conclusion of detection of a tunnel 12 being travelled through by the vehicle 10, more particularly of the detection of the vehicle 10 travelling into the exit 16 of the tunnel 12.

Likewise, in the fifth scenario 76 (fifth row), the first correspondence level FL1 between the detected amplitude variation in the radiofrequency signal and an exponential decreasing amplitude variation 42 is 70%, and the second correspondence level FL2 between the detected amplitude variation in the radiofrequency signal and an exponential increasing amplitude variation 46 is 0%. Since the predetermined minimum correspondence threshold TH has been set at 70%, the system then draws a conclusion of detection of a tunnel 12 being travelled through by the vehicle 10, more particularly of the detection of the vehicle 10 travelling into the entrance 14 of the tunnel 12.

In the sixth scenario 78 (sixth row), the first correspondence level FL1 between the detected amplitude variation in the radiofrequency signal and an exponential decreasing amplitude variation 42 is 60%, and the second correspondence level FL2 between the detected amplitude variation in the radiofrequency signal and an exponential increasing amplitude variation 46 is 0%. Since the predetermined minimum correspondence threshold TH has been set at 70%, the system then draws a conclusion of lack of detection of a tunnel 12 being travelled through by the vehicle 10.

It should be noted that, in the last scenario 80 shown (7th row), the first correspondence level FL1 between the detected amplitude variation in the radiofrequency signal and an exponential decreasing amplitude variation 42 is 0%, and the second correspondence level FL2 between the detected amplitude variation in the radiofrequency signal and an exponential increasing amplitude variation 46 is 60%. In this last scenario 80, the two conditions of surprising variations in weather conditions have been detected, allowing the value of the predetermined minimum correspondence threshold TH to be adjusted to 60%. In this case, the detection system 52 draws a conclusion of detection of a tunnel 12 being travelled through by the vehicle 10, and more particularly of the detection of the vehicle 10 travelling into the exit 16 of the tunnel 12.

Figure 5:
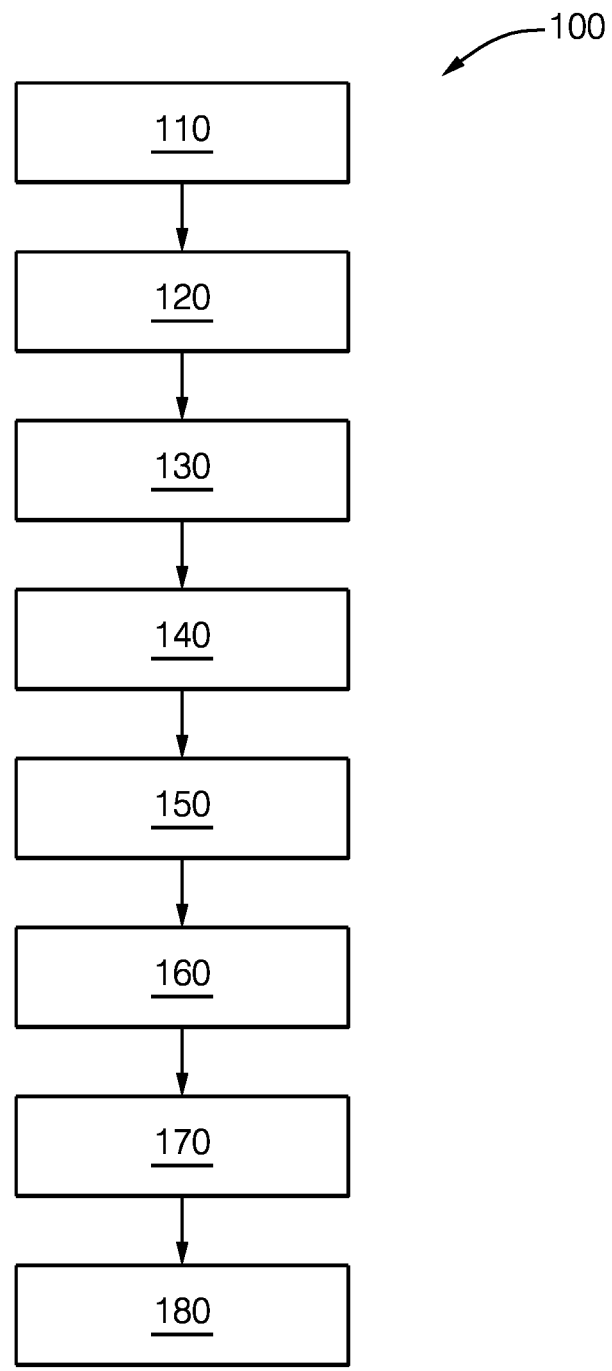
FIG. 5 is a flowchart of a method for detecting a tunnel by way of a motor vehicle.

In FIG. 5, a method 100 for detecting a tunnel 12 by way of a motor vehicle 10 comprises a first step consisting in receiving 110 a radiofrequency signal coming from a source external to the vehicle 10.

The second step is a step of detecting 120 the amplitude variation in the received radiofrequency signal.

The following step consists in determining at least one correspondence level FL representative of the difference between the detected amplitude variation in the received radiofrequency signal and at least one predetermined reference signal RS amplitude variation representative of the received signal amplitude variation when the vehicle 10 travels into a tunnel 12. This step may preferably consist of two steps: a first step of determining 130 a first correspondence level FL1 representative of the difference between the detected amplitude variation in the radiofrequency signal and a predetermined exponential decreasing amplitude variation 42 representative of the system 52 travelling into a tunnel 12 entrance 14; and a second step of determining 140 a second correspondence level FL2 representative of the difference between the detected amplitude variation in the radiofrequency signal and a predetermined exponential increasing amplitude variation 46 representative of the system 52 travelling into a tunnel 12 exit 16.

The following step is an optional step of detecting 150 variations in weather conditions, such as for example an abrupt rain shower 28 or brightness variation. This step of detecting variations in weather conditions allows a step of adjusting 160 a predetermined minimum correspondence threshold TH.

The following step consists in comparing 170 the determined correspondence levels FL1, FL2 with the predetermined minimum correspondence threshold TH.

The last step consists in detecting 180 the tunnel 12 being travelled through by the vehicle 10 when at least one determined correspondence level FL1, FL2 is greater than or equal to the predetermined minimum correspondence threshold TH.

According to the invention, the method 100 for detecting a tunnel 12 by way of a motor vehicle 10, described above, may form part of a method for activating an automatic emergency braking function 57 of a vehicle 10, such that, when a tunnel being travelled through by the vehicle 10 is detected, the detection system 52 authorizes the automatic emergency braking function 57.

We claim:

1. A tunnel detection system for a motor vehicle comprising:
    a radiofrequency signal receiver that receives a radiofrequency signal coming from a source external to the vehicle;
    a controller communicating with the radiofrequency signal receiver, the controller configured to detect at least one amplitude variation in the radiofrequency signal received by the receiver;
    at least one sensor for sensing at least one weather condition;
    the controller is configured to determine at least one correspondence level representative of the difference between the detected amplitude variation in the radiofrequency signal and at least one predetermined reference signal amplitude variation representative of the amplitude variation in a signal received by the receiver when the receiver travels into a tunnel;
    the controller is configured to compare the determined correspondence level with a predetermined minimum correspondence threshold;
    the controller is configured to detect the tunnel being travelled through by the detection system when the determined correspondence level is greater than or equal to the predetermined minimum correspondence threshold;
    the controller is configured to detect at least one weather condition variation;
    the controller is configured to adjust the predetermined minimum correspondence threshold in accordance with the detected weather condition variation.

2. The tunnel detection system according to claim 1, wherein the radiofrequency signal receiver comprises a satellite geolocation system.

3. The tunnel detection system according to claim 1, wherein the predetermined reference signal amplitude variation comprises an exponential decreasing or exponential increasing amplitude variation, representative of the receiver travelling into a tunnel entrance or into a tunnel exit, respectively, so as to be able to detect the tunnel being travelled through by the detection system.

4. A motor vehicle that includes the tunnel detection system of claim 1.

5. A method for detecting a tunnel comprising:
- receiving a radiofrequency signal coming from a source external to the vehicle;
- detecting an amplitude variation in the received radiofrequency signal;
- determining at least one correspondence level representative of the difference between the detected amplitude variation in the radiofrequency signal and at least one predetermined reference signal amplitude variation representative of the received signal amplitude variation when the vehicle travels into a tunnel;
- comparing the determined correspondence level with a predetermined minimum correspondence threshold;
- detecting the tunnel being travelled through by the vehicle when the determined correspondence level is greater than or equal to the predetermined minimum correspondence threshold;
- the step of comparing the determined correspondence level with a predetermined minimum correspondence threshold comprises, beforehand, the steps of:
- detecting a variation in weather conditions;
- adjusting the predetermined minimum correspondence threshold according to the detected weather condition variation.

6. The method according to claim 1, wherein the step of determining at least one correspondence level comprises a step of determining at least one correspondence level representative of the difference between the detected amplitude variation in the radiofrequency signal and a predetermined exponential decreasing or predetermined exponential increasing amplitude variation representative of the receiver travelling into a tunnel entrance or into a tunnel exit, respectively.

* * * * *